July 1, 1952  S. H. FILLION  2,601,781
COUPLER FOR DYNAMOMETER PURPOSES
Filed Dec. 9, 1950
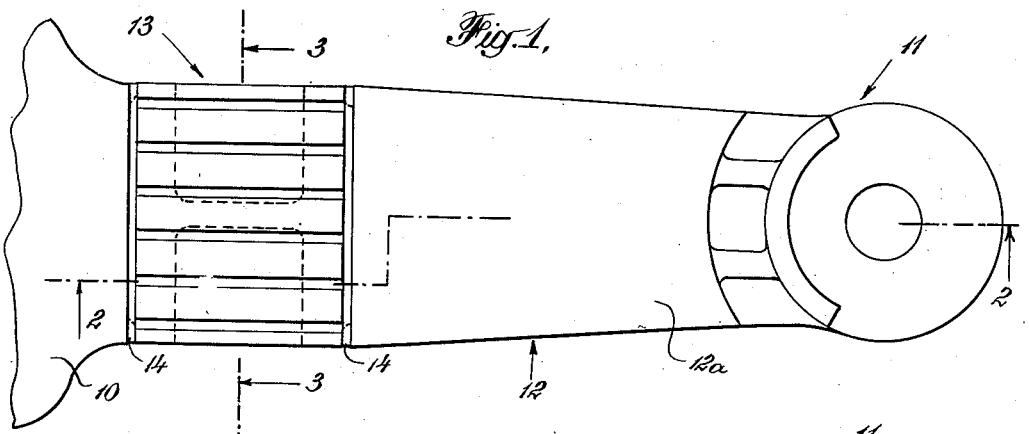
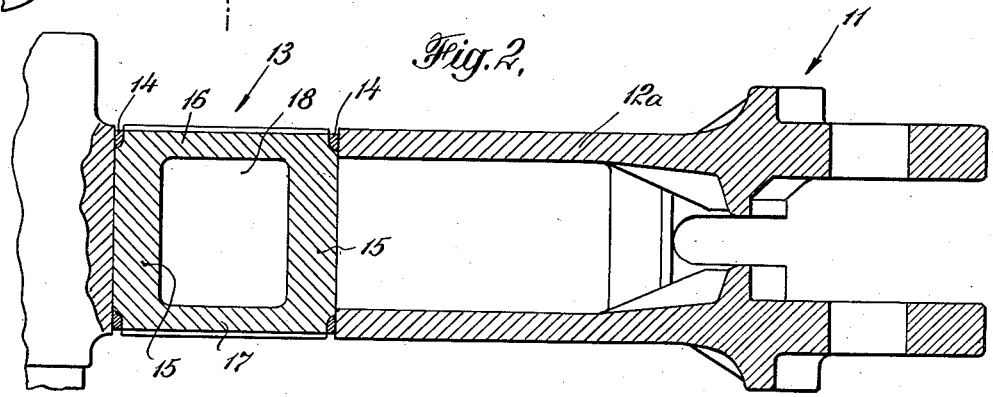
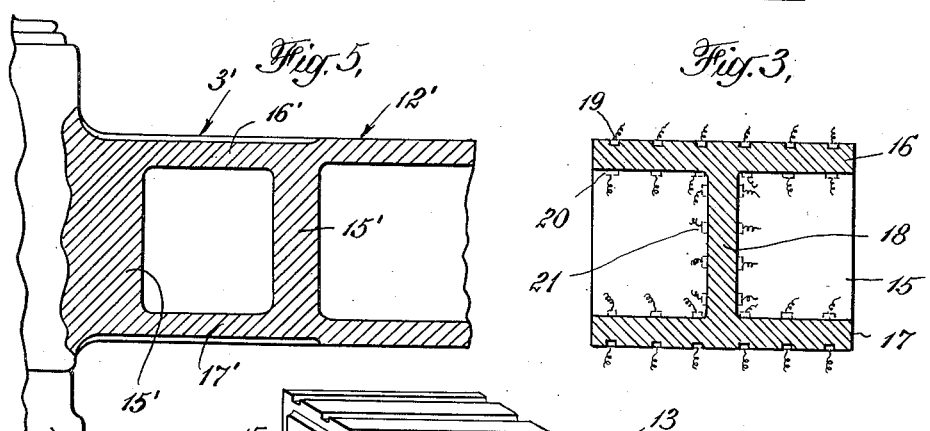
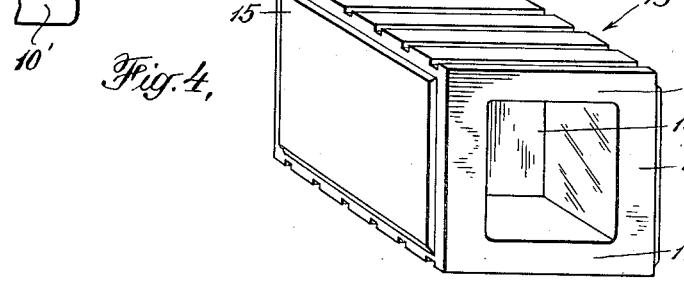
INVENTOR
Stanley H. Fillion
BY Pennie Edmonds
Morton & Barrows
ATTORNEYS Patented July 1, 1952

2,601,781

UNITED STATES PATENT OFFICE 2,601,781

COUPLER FOR DYNAMOMETER PURPOSES

Stanley H. Fillion, Scarsdale, N. Y., assignor to Waugh Equipment Company, New York, N. Y., a corporation of Maine Application December 9, 1950, Serial No. 199,959

3 Claims. (Cl. 73—141)

This invention relates to couplers for use on railway vehicles and consisting of a shank to be connected to a yoke encircling the draft gear of the vehicle or to a cushion underframe on the vehicle, and a head to be engaged with the head of the coupler on the adjacent vehicle. More particularly, the invention relates to a novel coupler for use in the dynamometer testing of draft gears and cushion underframes for the purpose of determining their efficacy in absorbing shocks transmitted through the coupler to the structure of the vehicle.

At the present time, in the testing of cushioning mechanism, such as draft gears, employed on railway cars, it is important to know the forces transmitted to the car structure through the draft gear as a function of time. The intensity of the forces may be determined by strain gauges applied to the coupler shank and, since the intensity of the forces varies with time and the forces are, in some cases, vibratory in nature, it is desirable to employ strain gauges, such as those of the electrical resistance type, which will give simultaneous readings at a number of points. Such gauges may be readily mounted on the sills in such positions as to give accurate readings but it is not possible to mount the gauges in that manner on the shank of an ordinary coupler. The reasons are that the shank of such a coupler is of hollow rectangular section, so that the inner surface of the wall is inaccessible, and the coupler is cast of a grade B steel, which is unlikely to have a uniform modulus of elasticity. Accordingly, for accurate results, the gauges should be mounted on the shank in pairs, with one gauge of each pair on the outside of the wall of the shank and the other on the inside of the wall opposite the first. However, there is no way of mounting the gauges on the inner surface of the shank, since the formation of access openings in the wall would weaken the shank objectionably.

The present invention is directed to the provision of a coupler, which has a conventional head and butt and is so constructed that it may be readily used in the dynamometer testing of cushioning mechanism by means of electrical strain gauges. The new coupler includes the usual shank connecting the head and butt, and the shank has a portion of standard hollow rectangular section. The remainder of the shank, which preferably lies adjacent the head, consists of a section made of a steel having a modulus of elasticity constant over the entire loading range and constructed with end walls lying transverse to the shank and opposed side walls connecting the end walls. The end and side walls define a space rectangular in section, which is subdivided into two parts by a central longitudinal wall connected to the end and side walls. With the arrangement described, the opposite faces of the longitudinal wall and of both side walls are accessible, so that a plurality of electrical strain gauges may be mounted thereon in pairs with the gauges of all pairs responsive to strains in approximately the same volume of metal. Tests conducted with the new coupler are, accordingly, more accurate than those made with conventional couplers, since errors arising from variations in the modulus of elasticity of the metal and from differences in thickness of the shank wall are eliminated.

For a better understanding of the invention, reference may be made to the accompanying drawing, in which:

Fig. 1 is a top plan view of one form of the new coupler;

Figs. 2 and 3 are sectional views on the lines 2—2 and 3—3, respectively, the gauges being shown in position in Fig. 3;

Fig. 4 is a view in perspective of the test section of the coupler of Fig. 1; and Fig. 5 is a partial vertical longitudinal section of another form of the coupler.

The coupler of the invention in the form shown in Fig. 1 includes a conventional head 10 and swivel butt 11 connected by a shank 12. The portion 12a of the shank is of hollow rectangular section, as is usual, and it is connected to the head 10 by a test section, generally designated 13.

The test section 13 may be separately formed and connected to the head 10 and shank portion 12a by welding, as indicated at 14. Section 13 comprises end walls 15 extending transversely and connected by upper and lower side walls 16, 17. The end and side walls define a space divided by a central longitudinal wall 18, the faces of which are exposed at opposite sides of the shank. The test section may be made by casting and the side walls may be machined to uniform thickness, if necessary. In addition, the outer faces of the side walls may be longitudinally slotted to receive the strain gauges 19 and other strain gauges 20 may be mounted on the inner faces of the walls aligned with those on the outer faces. The pairs of gauges, one on the inner face and the other on the outer face of each side wall, are properly spaced so that all pairs of gauges respond to forces imposed on approximately the same cross-sectional area of metal. Gauges 21 are also mounted in pairs on the opposite faces of the central longitudinal wall 18 in the arrangement described.

The coupler shown in Fig. 5 is similar to that described except that the test section 13' is cast integrally with the head 10' and the remainder of the shank 12'. The side walls 16' and 17' are then machined to uniform thickness and slotted on their outer surfaces for reception of the strain gauges.

In the use of either form of the new coupler, the strain gauges mounted on the walls of the test section are connected in series parallel with a source of energy and a recording meter. When a force is imposed on the coupler, the resistance of the gauges varies in response to the force and the change in resistance is a measure of the force. Since the gauges can be mounted in pairs on the inner and outer faces of the longitudinally extending central and side walls of the test section, the gauges can be distributed in the proper arrangement to give accurate measurements and eliminate errors which would arise, if the gauges were mounted on the outer faces only of the walls of the test section.

I claim:

1. A coupler comprising a head and a shank, the shank including a test portion having a pair of spaced transverse end walls, a pair of opposed side walls connecting the end walls along corresponding edges thereof, and a central longitudinal wall connected to the end and side walls, and a plurality of strain gauges mounted in pairs on the inner and outer surfaces of the side walls and opposite faces of the central wall, the gauges extending lengthwise of the shank.

2. A coupler comprising a head and a shank, the shank including a test portion having a pair of spaced transverse end walls, a pair of opposed side walls connecting the end walls along corresponding edges thereof, and a central longitudinal wall connected to the end and side walls, the outer surfaces of the side walls having spaced channels lengthwise of the shank, and a plurality of strain gauges mounted in pairs on the opposite faces of the central wall and on the inner and outer surfaces of the side walls, the gauges on the outer surfaces of the side walls lying within the channels and all the gauges extending lengthwise of the shank.

3. A metallic test section for use as part of the shank of a coupler, which comprises a pair of spaced end walls, a pair of opposed side walls connecting the end walls along corresponding edges thereof, the outer surfaces of the side walls being formed with spaced parallel channels extending lengthwise of the walls, a central longitudinal wall connected to the end and side walls, and strain gauges mounted in pairs of the side and central walls, one gauge of each pair lying on the inner surface and the other gauge of the pair lying on the outer surface of a wall, the pairs of gauges being spaced so that all pairs respond to strains in substantially the same volume of metal and the gauges on the outer surfaces of the side walls lying in the channels.

STANLEY H. FILLION.

REFERENCES CITED

The following references are of record in the file of this patent:

UNITED STATES PATENTS

| Number | Name | Date |
|---|---|---|
| 2,487,595 | Ruge | Nov. 8, 1949 |
| 2,488,347 | Thurston | Nov. 15, 1949 |
| 2,561,318 | Ruge | July 17, 1951 |